United States Patent [19]

Charkoudian et al.

[11] 4,112,205
[45] Sep. 5, 1978

[54] BATTERY ELECTROLYTE CORROSION INHIBITOR

[75] Inventors: John C. Charkoudian, Cambridge; Arnold Hoffman, Brookline, both of Mass.

[73] Assignee: Polaroid Corporation, Cambridge, Mass.

[21] Appl. No.: 536,432

[22] Filed: Dec. 26, 1974

[51] Int. Cl.² .............................................. H01M 6/04
[52] U.S. Cl. .................................... 429/199; 429/224; 429/229
[58] Field of Search ............... 136/155, 107, 102, 154, 136/100 R, 30; 429/199, 224, 229

[56] References Cited

U.S. PATENT DOCUMENTS

| | | | |
|---|---|---|---|
| 2,566,114 | 8/1951 | Block | 136/155 X |
| 3,615,859 | 10/1971 | Schumm, Jr. | 136/107 |
| 3,634,138 | 1/1972 | Voorhies | 136/107 X |
| 3,658,593 | 4/1972 | Caiola et al. | 136/155 X |
| 3,660,170 | 5/1972 | Rampel | 136/154 |
| 3,775,183 | 11/1973 | Paulson | 136/155 X |
| 3,816,177 | 6/1974 | Walsh | 136/30 X |
| 3,877,993 | 4/1975 | Davis | 136/155 X |

Primary Examiner—Charles F. LeFevour
Attorney, Agent, or Firm—Philip G. Kiely

[57] ABSTRACT

A galvanic cell having a zinc anode which contains in the electrolyte as a corrosion inhibitor a chloride double salt containing mercuric ions and quaternary ions. The corrosion inhibitor may be represented by the formula:

$$M\,Hg_x\,Cl_y$$

wherein $M$ is a quaternary ammonium cation, $x$ is 1, 2 or 3, and $y$ is 3 to 8.

11 Claims, 11 Drawing Figures

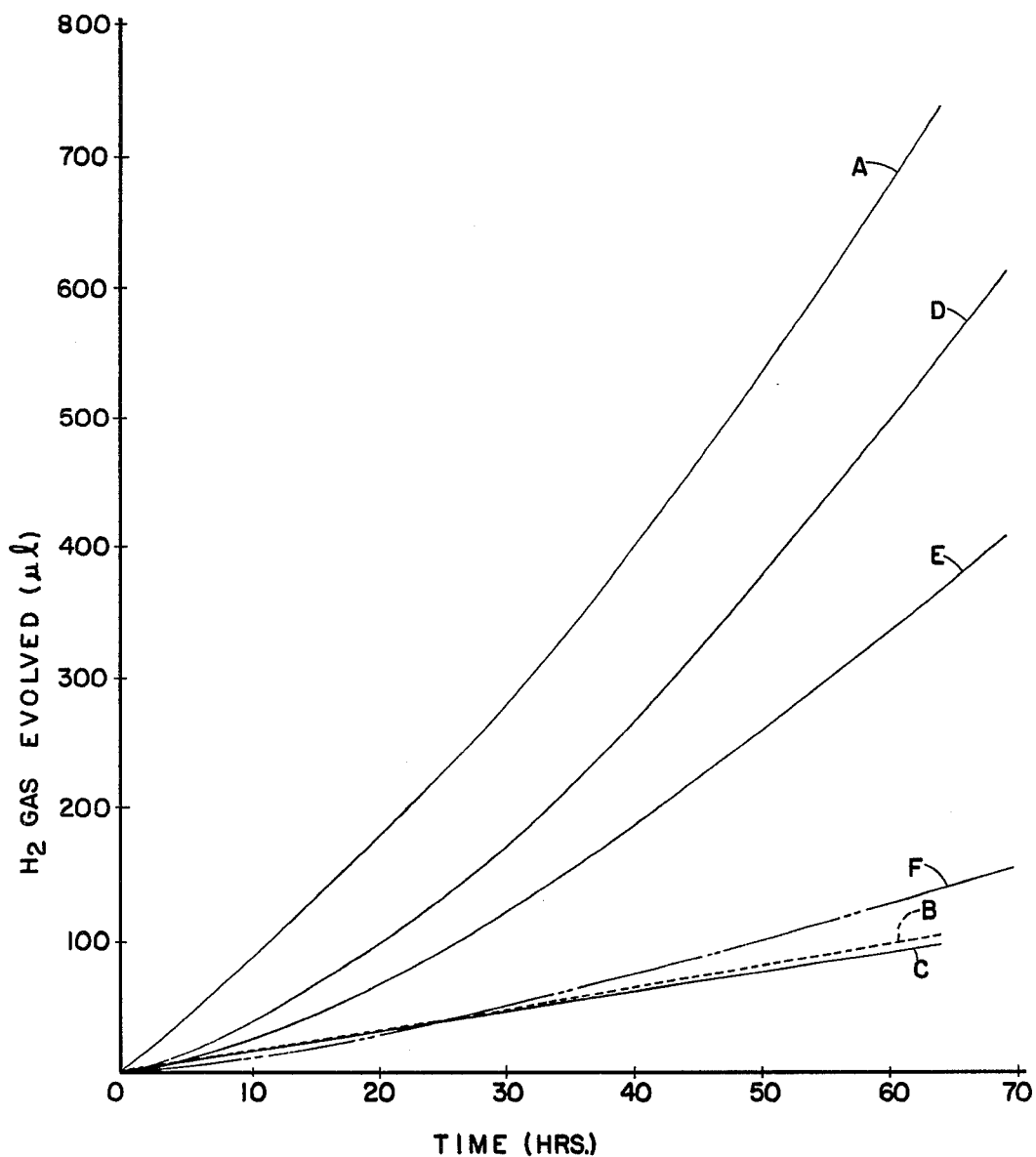

BATTERY ELECTROLYTE CORROSION INHIBITOR

BACKGROUND OF THE INVENTION

Primary and secondary cells have a loss of capacity on storing because of a self-discharge and dissolution of the metal electrodes. Thus, more specifically, the shelf life of a cell employing a zinc anode, such as a Leclanche system, is limited by, among other factors, the open circuit corrosion of the zinc anode which causes dissolution of the metallic zinc and discharge of hydrogen gas.

To avoid the corrosion of the zinc, a variety of corrosion inhibitors have been added to the electrolyte. One of the oldest and most effective corrosion inhibition techniques involves the amalgamation of the zinc by mercury. While a pre-amalgamation treatment of the zinc may be carried out, it is more conventional to apply mercuric chloride to the zinc as a component of the electrolyte.

Flat or planar batteries of the general type disclosed, for example, in U.S. Pat. Nos. 3,563,805; 3,617,387; 3,734,780; and the like, comprise superposed planar anode/cathode combinations possessing a separator disposed intermediate each anode and cathode and electrolyte disposed on or impregnated in the separator and in contact with respective facing surfaces of the anode and cathode.

Planar batteries of the type disclosed in the aforementioned U.S. patents are generally intended to be employed as an individual power source for portable electrically operated devices wherein the selected device design parameters are optimized by the availability and employment of a planar battery exhibiting reliability with respect to its power delivery characteristics. Batteries of the type in question presently are employed commercially to operate the various electrically powered systems of the photographic camera sold by Polaroid Corporation, Cambridge, Mass., U.S.A., under the trademark "SX-70". In such cameras, the battery, disposed as a component of a film pack for employment in and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions to deliver the required series of high current pulses dictated by the photographic system design.

Particular problems of amalgamation are presented with the above-described flat, planar batteries. Generally, powdered zinc is employed as the anode, which contains a relatively large amount, e.g., 5% or more, of zinc oxide and which presents a large surface area to the electrolyte. Amalgamation proceeds rapidly with the available zinc surfaces being protected by the interaction of the zinc with mercuric ions to form a zinc amalgam.

Subsequent to amalgamation and in contact with the electrolyte, the zinc oxide portion of the anode slowly dissolves providing fresh, unamalgamated zinc surfaces which result in increased hydrogen gas generation and attendant increase in impedence and general deterioration of the battery. Also, if less than full surface coverage by electrolyte occurs initially upon assembly subsequent redistribution of mercury-ion depleted electrolyte will also result in inadequately amalgamated zinc surfaces. The art has recognized that the effectiveness of amalgamation to inhibit corrosion is superior at room temperature but inadequate at elevated temperatures.

Copending application Ser. No. 50,354 filed June 26, 1970 now U.S. Pat. No. 3,945,849 is directed to the employment of quaternary ammonium halide as a corrosion inhibitor for zinc anodes. This inhibitor has been found to be more effective at elevated temperatures than at room temperature.

A novel corrosion inhibition system has now been found which is not susceptible to the deficiencies of the prior art.

SUMMARY OF THE INVENTION

The present invention is directed to a galvanic cell having a zinc anode having disposed in the electrolyte a chloride double salt containing both mercuric ion and a quaternary ion. The double salts suitable for employment in the present invention are represented by the formula:

$$M\, Hg_x Cl_y$$

wherein $M$ is a quaternary cation, $x$ is 1, 2 or 3, and $y$ is 3 to 8.

The novel corrosion inhibitor of the present invention provides for a relatively continuous source of mercuric ion to the zinc as required to minimize corrosion of unamalgamated zinc as zinc oxide goes into solution and new zinc surfaces are exposed. The corrosion inhibitor also provides high temperature corrosion inhibition associated with the use of a quaternary halide as well as the room temperature effectiveness of mercury amalgamation.

BRIEF DESCRIPTION OF THE DRAWING

The FIGURE is a graphic representation showing the evolution of gas as a function of time from cells containing prior art inhibitors as compared with the novel double salt corrosion inhibitors of the present invention.

DETAILED DESCRIPTION OF THE INVENTION

The present invention is directed to the attenuation of corrosion of zinc anodes by providing to the electrolyte a double salt of a quaternary chloride and mercuric chloride which will provide a double corrosion inhibition system. As demanded by the zinc anode, the novel corrosion inhibitor of the present invention will provide mercury for amalgamation of zinc surfaces, especially newly exposed zinc surfaces resulting from the dissolution of zinc oxide in the electrolyte as well as a quaternary chloride which can provide room temperature corrosion inhibition and is particularly effective at elevated temperatures, e.g., 120° F.

The objects of the present invention are achieved by disposing in the electrolyte a double salt as described above. While not intending to be bound by the theory, it is believed that the mechanism may be represented as follows:

$$M\, Hg_x Cl_y \rightleftarrows M^+ + Hg_x Cl_y^- \quad (A)$$

$$Hg_x Cl_y \rightleftarrows X\, Hg^{++} + 3Cl^- \quad (B)$$

$$Hg^{++} + Zn \rightleftarrows Hg + Zn^{+2}$$

$$Hg + Zn \rightarrow Hg\, Zn\; \text{amalgam} \quad (C)$$

wherein M is a quaternary compound. Thus, the equilibrium reaction of the double salt provides a finite amount of Hg$^{++}$ ions. However, as the Hg$^{++}$ ions are reduced by the zinc, the reaction would shift toward the right providing a continuous supply of Hg$^{++}$ ions on demand as new zinc surfaces became available for amalgamation. Substantially contemporaneously, quaternary cations, as indicated in (A) above, become available to the zinc as a corrosion inhibitor.

The particular quaternary chloride employed to form the double salt of the present invention is not critical. It should be understood that the term "quaternary chloride" as used herein is intended to include both quaternary ammonium chloride and quaternized heterocyclic compounds. Suitable quaternary ammonium chlorides are those disclosed in copending application Ser. No. 50,354 filed June 26, 1970, particularly the tetraalkyl ammonium chlorides, such as tetraalkyl ammonium chloride and tetraethylammonium chloride. Suitable quaternary ammonium chlorides include the following:

  (1)

  (2)

  (3)

Suitable quaternized heterocyclic compounds include the following:

4.
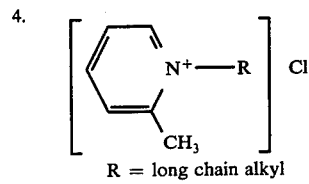
R = long chain alkyl

5.
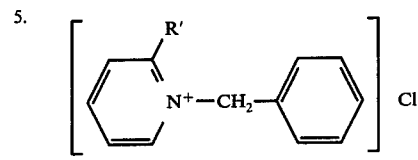

6.
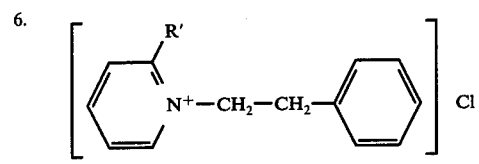

R' = H or methyl

The double salts employed in the present invention are prepared by mixing aqueous solutions of the mercuric chloride and quaternary chloride and collecting the resulting precipitate. Generally, relatively dilute solutions are employed, e.g., about 5% solution. The two reactants are employed in the proportions desired in the double salt. The procedure for preparing such double salts is set forth in *J. Chem. Soc.*, 1961, pages 3929–3935.

The following example illustrates the preparation of double salts within the scope of the present invention.

EXAMPLE I

A 5% solution of tetraethyl ammonium chloride and a 5% solution of mercuric chloride were mixed in a 1:1 ratio by weight. The thus-formed precipitate was separated and dried. The double salt $(C_2H_5)_4NHg_2Cl_5$ was then analyzed.

|  | % of Element | | | |
|---|---|---|---|---|
|  | C | H | N | Cl |
| Calculated: | 13.54 | 2.86 | 1.97 | 25.04 |
| Found: | 13.46 | 2.88 | 1.94 | 22.64 |

EXAMPLE II

Stoichiometric amounts of 5% aqueous solutions of N-benzyl-α-picolinium chloride and mercuric chloride were mixed and the resulting precipitate was separated. The double salt

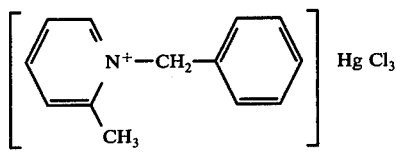

was then analyzed.

|  | C | H | N | Cl |
|---|---|---|---|---|
| Calculated: | 31.72 | 2.91 | 2.97 | 20.00 |
| Found: | 31.72 | 2.85 | 2.85 | 21.60 |

The double salts may be disposed in the electrolyte in various concentrations. Such concentrations may range between 0.02% and 2.0% based on the weight of electrolyte.

The corrosion inhibition properties of various materials were ascertained by preparing an electrolyte comprising 68–69 cc. of water, 22 g. of ammonium chloride and 10 g. of zinc chloride. Various inhibitors, both the double salts of the present invention and prior art inhibitors, were added to the indicated electrolyte composition and then 50 mgs. of particulate zinc anode were immersed in 3 g. of the electrolyte mix, and the gas evolved over a period of time was measured as an indication of corrosion of the zinc. The FIGURE graphically represents the degree of corrosion resistance provided by the various inhibitors. The inhibitors and their concentration in the electrolyte are set forth in the following table:

A — no inhibitor
B — 200 mgs. [(CH$_3$)$_4$ N] Hg$_2$ Cl$_5$
C — 200 mgs. [(C$_2$H$_5$)$_4$ N] Hg$_2$ Cl$_5$
D — 200 mgs. [CH$_3$ (C$_4$H$_9$)$_3$ N] Cl
E — 60 mgs. mercuric chloride
F — 200 mgs. [(C$_4$H$_9$)$_4$ N] Cl From the FIGURE it can be seen that the corrosion inhibitors of the present invention are far superior to the mercuric chloride and some of the quaternary ammonium chloride compounds and even shows less gassing with one of the preferred quaternary ammonium chloride compounds, t-butyl ammonium chloride.

With regard to the above table, it should be noted that an excess amount of mercuric chloride necessary to amalgamate zinc was employed. Thus, the advantages achieved by employing the double salt cannot be attributed to the greater relative quantity of mercury employed. The art has found that excess mercury does not enhance corrosion inhibition.

The novel method of the present invention is particularly suitable for use with anodes prepared from zinc dust. Such anodes, which are widely used in flat, planar batteries as described above, are particularly susceptible to corrosion because of the large surface area and because of the relatively high amount of zinc oxide present. It will also be readily recognized that the present invention is particularly useful in batteries which may be stored for relatively long periods of time before use. Deterioration of the battery due to corrosion is reduced, thus enhancing the reliability of the stored batteries.

Batteries of the type disclosed in U.S. Pat. Nos. 3,563,805; 3,617,387; and 3,734,780 were prepared employing the double salts of the present invention as corrosion inhibitors. The electrical properties of the batteries were substantially the same or slightly better than control batteries (amalgamated zinc).

It should also be noted that the double salt corrosion inhibitors of the present invention can also be employed in conjunction with conventional stabilizers such as mercuric chloride, quaternary ammonium compounds and chromates. The employment of the double salts in conjunction with these inhibitors would serve to provide long-term and continuing protection to late exposed zinc surfaces and also serve to control the direction of the equilibrium of the above-indicated reactions as desired.

What is claimed is:

1. A galvanic cell comprising a zinc anode, a cathode and an electrolyte, wherein the electrolyte contains as a corrosion inhibitor a double salt of the formula:

$$M\ Hg_x\ Cl_y$$

wherein $M$ is a quaternary cation, $x$ is 1, 2 or 3, and $y$ is 3 to 8.

2. The cell as defined in claim 1 wherein said cathode is manganese dioxide/carbon black and said electrolyte is ammonium chloride/zinc chloride.

3. The cell as defined in claim 1 wherein said quaternary cation is a quaternary ammonium cation.

4. The cell as defined in claim 3 wherein said double salt is $(CH_3)_4\ N\ Hg_2\ Cl_5$.

5. The cell as defined in claim 3 wherein said double salt is $(C_2H_5)_4\ N\ Hg_2\ Cl_5$.

6. The cell as defined in claim 1 wherein said quaternary cation is a quaternary heterocyclic cation.

7. The cell as defined in claim 6 wherein said double salt is

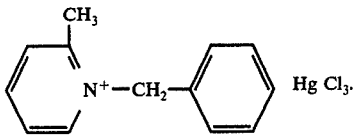

8. The cell as defined in claim 1 wherein said double salt is present initially in the electrolyte at a level of 0.02% to 2.0% based on the weight of the electrolyte.

9. The cell as defined in claim 1 wherein said electrolyte additionally contains a second corrosion inhibitor.

10. The cell as defined in claim 9 wherein said second corrosion inhibitor is mercuric chloride.

11. The cell as defined in claim 9 wherein said second corrosion inhibitor is a quaternary ammonium halide.

* * * * *